(12) United States Patent
Abbott (10) Patent No.: US 10,460,638 B2
(45) Date of Patent: Oct. 29, 2019

(54) INTERMITTENT DISPLAY ISSUE MONITORING SYSTEM

(71) Applicant: HONEYWELL INTERNATIONAL INC., Morris Plains, NJ (US)

(72) Inventor: Mark Perry Abbott, Phoenix, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 245 days.

(21) Appl. No.: 15/497,998

(22) Filed: Apr. 26, 2017

(65) Prior Publication Data

US 2018/0315363 A1  Nov. 1, 2018

(51) Int. Cl.
| G09G 3/00 | (2006.01) |
| G06F 11/22 | (2006.01) |
| G06F 11/24 | (2006.01) |
| G09G 5/00 | (2006.01) |

(52) U.S. Cl.
CPC ......... *G09G 3/006* (2013.01); *G06F 11/2221* (2013.01); *G06F 11/24* (2013.01); *G09G 5/003* (2013.01); *G09G 2320/0247* (2013.01); *G09G 2330/12* (2013.01); *G09G 2360/145* (2013.01)

(58) Field of Classification Search
CPC .................................................... G09G 3/006
See application file for complete search history.

(56) References Cited

U.S. PATENT DOCUMENTS

| 6,966,486 | B2 | 11/2005 | Ferraro |
| 7,924,346 | B2 | 4/2011 | Starr et al. |
| 8,379,107 | B2 | 2/2013 | Chen |
| 8,804,003 | B2 | 8/2014 | Cami |
| 2003/0208305 | A1 | 11/2003 | Junk |
| 2005/0232476 | A1* | 10/2005 | Hayakawa ............. G09G 3/006 382/141 |
| 2006/0114525 | A1* | 6/2006 | Yoo ........................ H04N 17/04 358/504 |
| 2016/0086574 | A1 | 3/2016 | Buckley |

FOREIGN PATENT DOCUMENTS

WO    2008007729 A1    1/2008

OTHER PUBLICATIONS

Extended EP Search Report for Application No. 18168611.4 dated Oct. 22, 2018.

* cited by examiner

*Primary Examiner* — Michael Pervan
(74) *Attorney, Agent, or Firm* — Lorenz & Kopf, LLP (57) ABSTRACT

A system to detect intermittent failures of a display system including a display and a display processing system is provided. The system may include, but is not limited to, a sensor system configured to capture a light level of the display, and a processor configured to cause the display processing system to generate the static image on the display, determine, when the display is displaying the static image, a baseline light level of the display, validate an existence of an intermittent display error when the light level of the display is greater than the baseline light level by a first predetermined amount or when the light level of the display is less than the baseline light level by a second predetermined amount at least once over the predetermined amount of time, determine a recurrence rate, and associate an error type with each instance.

14 Claims, 4 Drawing Sheets

INTERMITTENT DISPLAY ISSUE MONITORING SYSTEM

TECHNICAL FIELD

The present disclosure generally relates to a display system, and more particularly relates to systems and methods for testing a display system.

BACKGROUND

Display systems are found in a wide variety of applications. Some applications may be intolerant of any errors, even intermittent display errors. An intermittent display error may be, for example, an infrequent dimming, blanking or flashing of a display. The intermittent display error may only occur, for example, less than once a day and maybe for only fraction of a second.

BRIEF SUMMARY

A system to detect intermittent failures of a display system including a display and a display processing system is provided. The system may include, but is not limited to, a sensor system configured to capture a light level of the display, and a processor communicatively coupled to the sensor system and the display processing system, the processor configured to transmit instructions to generate a static image for a predetermined amount of time to the display processing system, the instructions causing the display processing system to generate the static image on the display for the predetermined amount of time, determine, when the display is displaying the static image, a baseline light level of the display based upon data received from the sensor system, validate an existence of an intermittent display error when the light level of the display is greater than the baseline light level by a first predetermined amount or when the light level of the display is less than the baseline light level by a second predetermined amount at least once over the predetermined amount of time, determine, when the existence of the intermittent display error is validated, a recurrence rate based upon instances when the light level of the display is greater than the baseline light level by the first predetermined amount or when the light level of the display is less than the baseline light level by the second predetermined amount and the predetermined amount of time, and associate, when the existence of the intermittent display error is validated, an error type with each instance that the light level of the display is greater than the baseline light level by the first predetermined amount or when the light level of the display is less than the baseline light level by the second predetermined amount.

In another embodiment, for example, a method to detect intermittent failures of a display system including a display and a display processing system is provided. The method may include, but is not limited to, transmitting, by a processor, instructions to generate a static image for a predetermined amount of time to the display processing system, the instructions causing the display processing system to generate the static image on the display for the predetermined amount of time, determining, by the processor, a baseline light level of the display based upon data received from a sensor system when the display is displaying the static image, validating, by the processor, an existence of an intermittent display error when a light level of the display is greater than the baseline light level by a first predetermined amount or when the light level of the display is less than the baseline light level by a second predetermined amount at least once over the predetermined amount of time, determining, by the processor when the existence of the intermittent display error is validated, a recurrence rate based upon instances when the light level of the display is greater than the baseline light level by the first predetermined amount or when the light level of the display is less than the baseline light level by the second predetermined amount and the predetermined amount of time, and associating, by the processor when the existence of the intermittent display error is validated, an error type with each instance that the light level of the display is greater than the baseline light level by the first predetermined amount or when the light level of the display is less than the baseline light level by the second predetermined amount.

In another embodiment, for example, an intermittent display issue monitor configured to detect intermittent failures of a display system including a display and a display processing system is provided. The intermittent display issue monitor may include, but is not limited to, a processor, a sensor system communicatively coupled to the processor, the sensor system configured to capture a light level of the display, the sensor system including a light sensor configured to output a voltage representative of the light level received by the light sensor, a filter coupled to an output of the light sensor, the filter configured to filter the output voltage at a frequency corresponding to a flicker of a light bulb, a programmable gain amplifier coupled to an output of the filter, the programmable gain amplifier configured to amplify the filtered output voltage and transmit the filtered output voltage to the processor, and an offset adjustment circuit coupled between the programmable gain amplifier and the processor, the offset adjustment circuit configured adjust a gain of the programmable gain amplifier to center the amplified filtered output voltage around an input voltage range of the processor, and wherein the processor is configured to transmit instructions to generate a static image for a predetermined amount of time to the display processing system, the instructions causing the display processing system to generate the static image on the display for the predetermined amount of time, determine, when the display is displaying the static image, a baseline light level of the display based upon data received from the sensor system, validate an existence of an intermittent display error when the light level of the display is greater than the baseline light level by a first predetermined amount or when the light level of the display is less than the baseline light level by a second predetermined amount at least once over the predetermined amount of time, determine, when the existence of the intermittent display error is validated, a recurrence rate based upon instances when the light level of the display is greater than the baseline light level by the first predetermined amount or when the light level of the display is less than the baseline light level by the second predetermined amount and the predetermined amount of time, and associate, when the existence of the intermittent display error is validated, an error type with each instance that the light level of the display is greater than the baseline light level by the first predetermined amount or when the light level of the display is less than the baseline light level by the second predetermined amount.

BRIEF DESCRIPTION OF THE DRAWINGS

The detailed description will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

An intermittent display issue monitoring system and method for operating an intermittent display issue monitoring system are provided. The intermittent display issue monitoring system monitors a display system for an extended amount of time to determine if the display system is having any intermittent failures.

Figure 1:
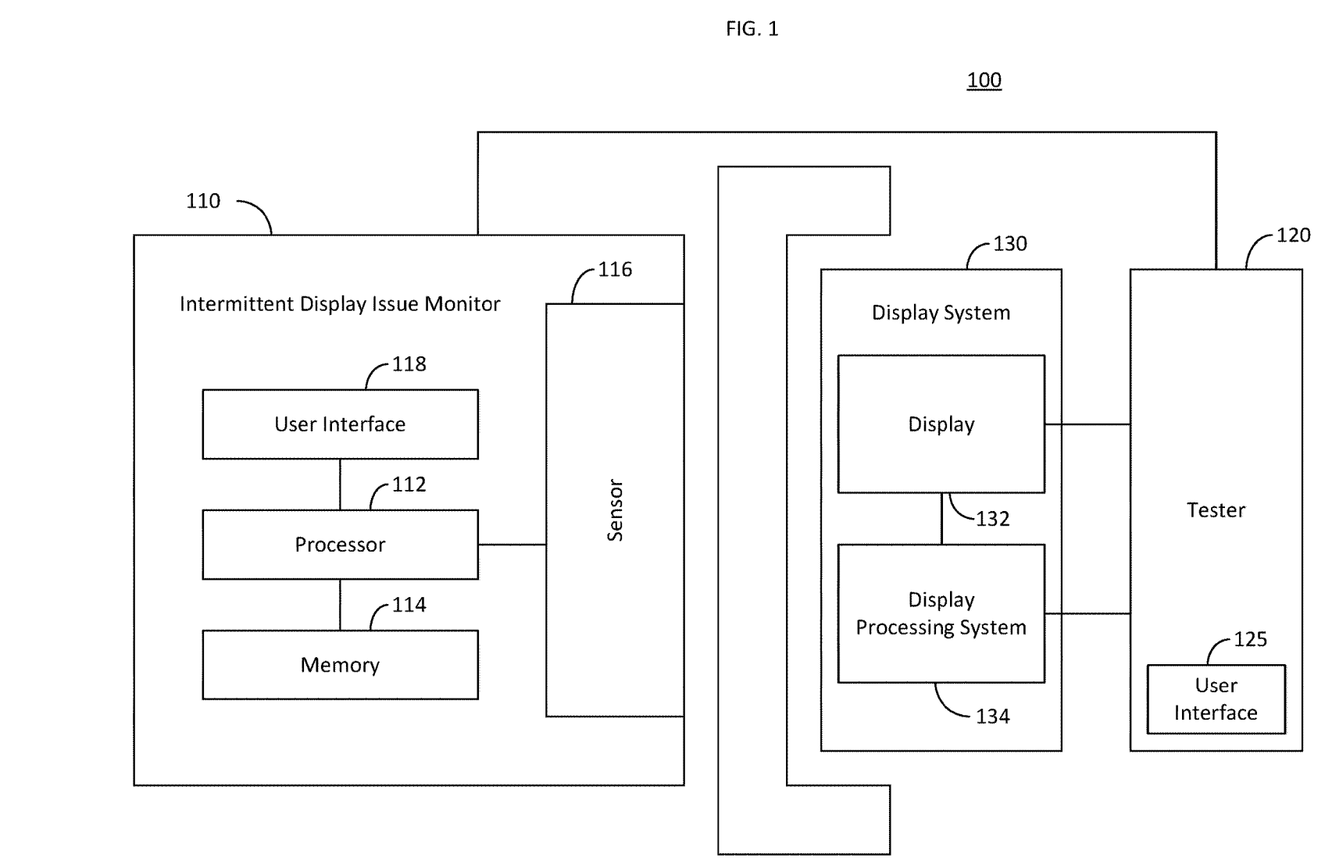
FIG. 1 is a block diagram illustrating an intermittent display issue monitoring system, in accordance with an embodiment.

FIG. 1 is a block diagram illustrating an intermittent display issue monitoring system 100, in accordance with an embodiment. The intermittent display issue monitoring system 100 (hereinafter referred to as system 100) includes an Intermittent Display Issue Monitor (IDIM) 110 and a tester 120 which can be arranged to test and monitor a display system 130 for intermittent display errors.

The display system 130 includes a display 132. The display 132 may be, for example, a cathode-ray-tube (CRT) display, a liquid crystal display (LCD), a light emitting diode (LED) display, an organic LED display, a plasma display, a projector, or the like. The display system 130 may further include a display processing system 134. The display processing system 134 includes any circuitry between the input of the display system 130 and the display 132 itself necessary to convert a signal input into the display system into an image on the display 132.

In one embodiment, for example, the IDIM 110 may only test part of the display system 130. For example, a known good (i.e., tested and certified) display 132 may be used during a test session to test a display processing system 134 for a fault. Likewise, a known good display processing system 134 may be used during a test session to test the display 132 for a fault. By utilizing a known good display 132 or a known good display processing system 134, the faulty component in the display system 130 can be isolated. However, the IDIM 110 can also conduct a test session with an unknown (i.e., potentially problematic) display 132 and an unknown display processing system 134 of a single display system 130 to validate the existence of an intermittent error in the display system 130 without isolating the components of the display system 130.

The display system 130 may be part of a mission critical system which is intolerant of any display errors. For example, the display system 130 may be on a fighter jet, a spacecraft or the like, where an error, even occurring for a fraction of a second once every few days, is unacceptable. In these mission critical systems, any time a user reports seeing a display error, the display system may have to be tested to validate the existence of the intermittent display error. Display systems 130 having a validated intermittent display error may need to be repaired, if possible, or replaced such that the display system operates flawlessly for the mission critical system. However, any display system 130 may be tested by the IDIM 110.

The intermittent display errors may include, for example, a blank error, a flash error, a blink error, a flicker error, an arc error, or the like. A blank error occurs when the display turns off (i.e., goes black) in error or reduces in luminance from an intended light level (i.e., without going completely black) in error. As discussed in further detail below, the IDIM 110 may determine that a blank error has occurred when the display 132 of the display system blanks for a period of time which is greater than a refresh rate of the display 132.

A flash error occurs when the display 132 goes high (i.e., gets brighter) in error giving off light in sudden or intransient bursts. A flash error can cause the display 132 to go to maximum brightness or may just brighten the display 132 beyond an intended light level, but not go to maximum brightness. Similar to the blank error, the IDIM 110 may determine that a flash error has occurred when the output intensity of the display 132 of the display system becomes significantly brighter for a period of time which is greater than a refresh rate of the display 132.

A blink error occurs when the display 132 slowly turns on and off. Similarly, a flicker error occurs when the display 132 quickly turns on and off. For example, a blink error may occur at a frequency which may be easily discerned by an observer, for example, at less than five hertz (5 Hz). A flicker error is an irregular or unsteady lighting condition, which may not have a fixed rate.

An arc error typically occurs in a CRT style display when a buildup of electrical charge discharges and lights up a portion of the display 132. An arc event would typically cause the display to become brighter, whereas the refresh operation causes it to go darker. Therefore the IDIM 110 can be configured to detect arcing at rates faster than the refresh rate of the display 130.

Any of the intermittent errors could occur extremely infrequently, for example, less than once per day and at irregular intervals. The infrequency of the intermittent errors makes them difficult to detect and validate as a technician may have to watch a display continuously for days to actually see the error to be able to validate the existence of the display error. The duration of the display error, which could be a fraction of a second, also contributes to the difficulty in validating the existence of an intermittent display error. The intermittent display errors may also be faint. In other words, the display 132 may only brighten or darken only slightly making the error nearly impossible for a technician to verify by merely manually watching a display 132.

Accordingly, in order to validate the existence of the intermittent display error, the system utilizes the IDIM 110. The IDIM includes a processor 112, a memory 114 and a sensor system 116. In one embodiment, for example, the processor 112 may be a microcontroller. However, in other embodiments other types of processors could be used, such as a central processing unit (CPU), a graphics processing unit (GPU), an application specific integrated circuit (ASIC), a field programmable gate array (FPGA), or any other logic device or combination thereof.

The processor 112 is coupled to the memory 114 via a data bus. The memory 114 may be any combination of volatile and non-volatile memory. The processor 112 may store an error log in the memory 114 while analyzing a display system 130, as discussed in further detail below. The memory 114 may also store non-transitory computer-readable instructions, which when executed by the processor 112, implement the IDIM 110, as discussed in further detail below.

The sensor system 116 is also coupled to the processor 112 via analog and/or digital inputs and outputs. The IDIM 110, and, in particular, the sensor system 116 may be arranged proximate to the display 132 of the display system 130. The sensor system 116 detects changes in the light level of the display 132 in order to detect and validate the existence of an intermittent error, as discussed in further detail below.

The IDIM 110 further includes a user interface 118. The user interface 118 may include, for example, a display, a touch interface, a mouse, a touchpad, a trackball, an audio system, one or more data transmission interfaces (i.e., a USB port, a cellular connection, a WIFI connection, an Ethernet connection), or the like, or any combination thereof. The user interface 118 allows a user of the IDIM 110 to interact with the IDIM (e.g., to start a test) and capture the results from the test, either by viewing the test results on a display of the user interface 118 or otherwise receive the results from a data transmission interfaces of the user interface 118.

The system 100 further includes a tester 120. The tester 120 may generate a signal which is output to the display system 130 during a test session. In the embodiment illustrated in FIG. 1, the tester 120 is a separate device from the IDIM 110. However, in another embodiment, the IDIM 110 may include the tester 120. In other words, the IDIM 110 can include a signal generator whose output may be connected transmitted to the display system 130 during a test session. When the tester 120 is a separate device, the IDIM may transmit instructions to the tester 120 to, for example, begin generating the signal for the test session via a communication bus. However, in other embodiments, a technician may manually start the generation of the test signal via a user interface 125 of the tester 120. The user interface 125 may include, for example, a display, a touch interface, a mouse, a trackball, a touchpad, a keyboard, hard or soft buttons or switches, or the like, or any combination thereof.

In one embodiment, for example, the system 100 may further include a hood 140. The hood 140 may couple the IDIM 110 to a display 132 of the display system 130. The hood 140 may minimize exterior light (i.e., light from windows, light bulbs, etc.) from triggering an error detection by the IDIM 110. In one embodiment, for example, the hood 140 may be made of a rigid material and may be customized to fit each display 132. However, in other embodiments, the hood 140 may be made from a flexible material such that the hood 140 could fit a variety of display sizes and shapes, or from a combination of rigid and flexible materials.

Figure 2:
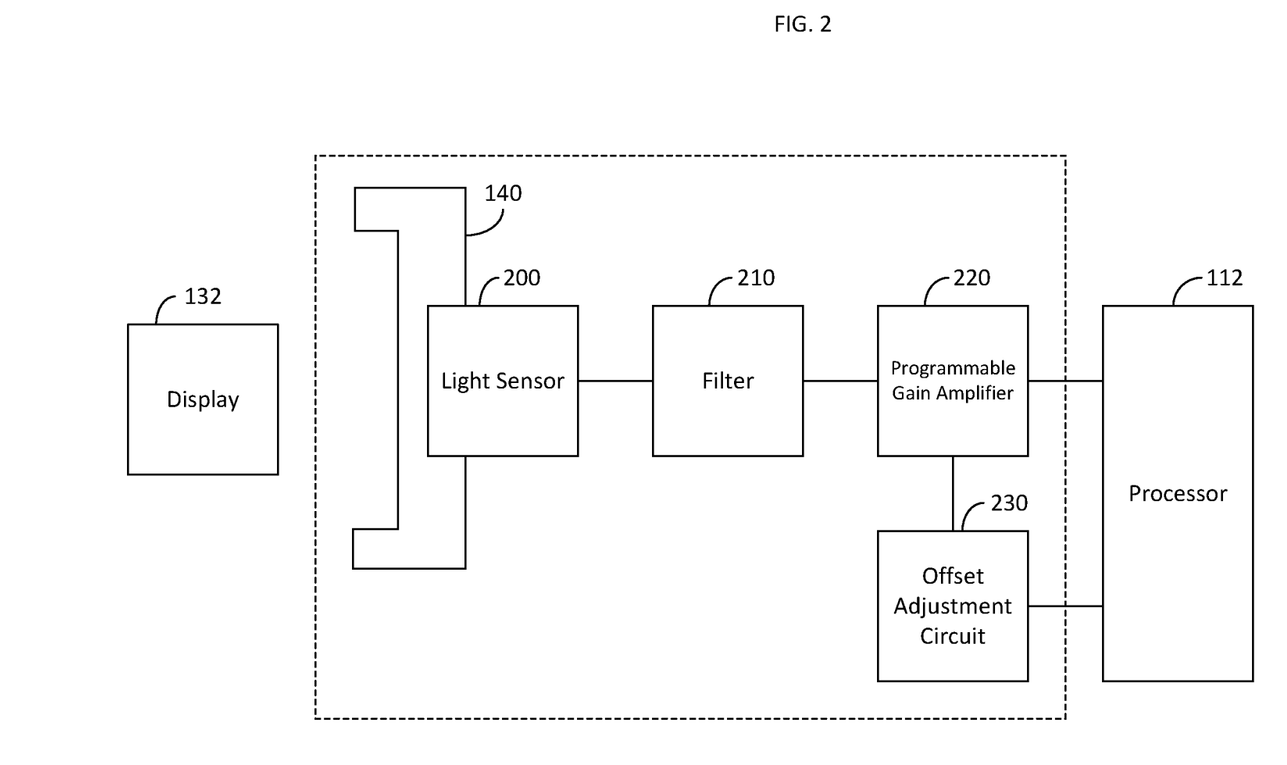
FIG. 2 is a block diagram illustrating an exemplary sensor system, in accordance with an embodiment.

FIG. 2 is a block diagram illustrating an exemplary sensor system 116, in accordance with an embodiment. The sensor system 116 includes at least one light sensor 200. Each light sensor 200 may be, for example, a photocell, photodiode, phototransistor, or the like, or any combination thereof. The light sensor 200 may output an analog voltage or current proportional to the light emitted by the display 132. In other words, a light sensor 200 may act like a transistor, where the greater the incoming light, the greater the analog voltage output by the light sensor 200. In one embodiment, for example, each light sensor 200 may utilize separate filters and amplifiers, as discussed in further detail below. In another embodiment, for example, a lens may be placed between one or more of the light sensors 200 and the display 132, allowing each light sensor to capture more light by focusing the light output by the display on each light sensor 200.

The analog output voltage of the light sensor 200 is passed through a filter 210. The filter 210 may filter out any undesirable frequency components of the analog output voltage of the light sensor 200 caused by electromagnetic interference (EMI) caused by other electronic devices in the same room as the system 100. For example, if the system 100 were in the same room as fluorescent a light bulb, which flickers at a frequency of one hundred twenty hertz, the filter 210 would reduce or eliminate the electrical noise caused by this EMI.

The processor 112 may have an input pin which accepts, for example, a voltage between zero volts and 5 volts. However, the light sensor output may range from, for example, zero to 500 millivolts. Accordingly, the sensor system 116 may further include a programmable gain amplifier 220 and an offset adjustment circuit 230. The programmable gain amplifier 220 amplifies the voltage output from the filter 210 such that the data the processor 112 has more granularity. In other words, the programmable gain amplifier 220 allows the processor 112 to better distinguish between small differences in input voltage by amplifying the voltage. For example, the output of the light sensor 200 may be in a range of, for example, zero to one volt (0.0V-1.0V) depending upon the amount of light the light sensor 200 receives. An input pin on the processor 112, however, may be able to receive input voltages between zero and five volts (0V-5V). In this embodiment, the programmable gain amplifier 220 may amplify the output of the light sensor 200 by a factor of five such that the entire input voltage rage of the processor 112 may be used, improving the granularity of the input data that the processor 112 receives.

The offset adjustment circuit 230 may be used to center the voltage output by the programmable gain amplifier 220. As discussed in further detail below, the display 132 or display processing system 134 is instructed to display a static image on the display 132. The display 132 should therefore cause a static (i.e., fixed or substantially fixed having a variability less than a trigger threshold for detecting an event) voltage to be output by the light sensor 200, unless a display error occurs. The offset adjustment circuit 230 adjusts a gain of the programmable gain amplifier 220 such that the static voltage received at the processor 112, when the display is operating as intended, is around the middle of the input voltage range of the processor 112. For example, if the voltage received at the processor 112 is around three and one-half volts (3.5V) after amplification by the programmable gain amplifier 220, and the operating range of the input pin to the processor 112 is zero to five volts (0V-5V), the offset adjustment circuit 230 provides input to the programmable gain amplifier 220 to reduce the voltage received at the processor 112 to two and one-half volts (2.5V) to center the input voltage within the zero to five volts (0V-5V) range. By centering the voltage output by the programmable gain amplifier 220, the offset adjustment circuit 230 further improves the granularity of the input to the processor 112. In other words, by centering the input, the offset adjustment circuit 230 allows for a larger range of inputs to be received. As an extreme example to better demonstrate the principle, if the voltage received at the processor 112 based upon the static image was around four and nine-tenths volts (4.9V) after amplification, but before adjustment by the offset adjustment circuit 230, and the operating range of the input pin to the processor 112 is zero to five volts (0V-5V), the processor 112 may not be able to accurately capture flashes or arcs and may not be able to provide any details on how bright the arcs or flashes were as any arc or flash would max out the input to the processor 112. Accordingly, by centering the input to, for example, two and one-half volts (2.5V), the processor 112 can capture an equal range of inputs in both directions (i.e., bright screen and darker screens).

Figure 3:
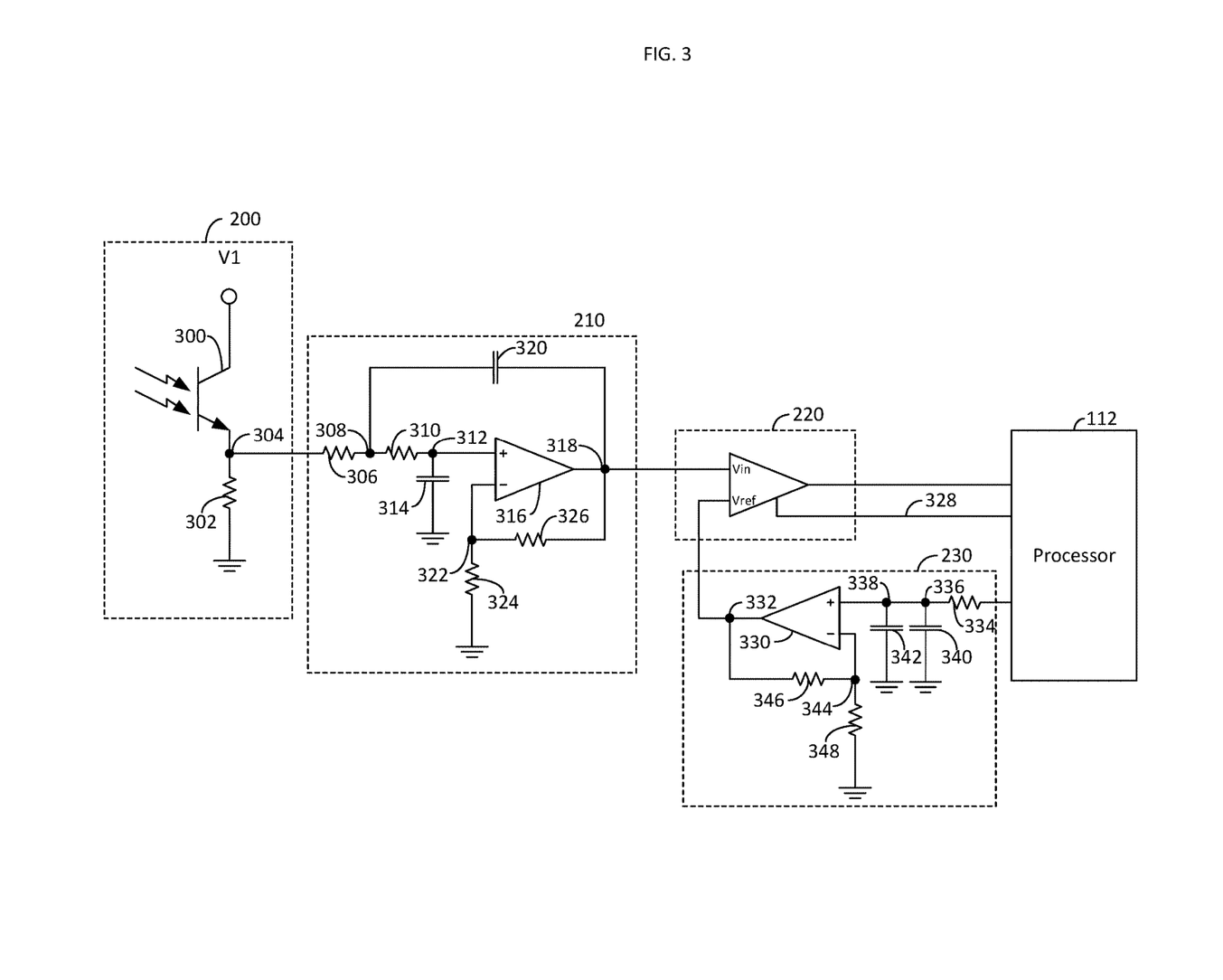
FIG. 3 is a circuit level diagram of an exemplary sensor system, in accordance with an embodiment.

FIG. 3 is a circuit level diagram of an exemplary sensor system 116, in accordance with an embodiment. In the embodiment illustrated in FIG. 3, the light sensor is illustrated as a silicon NPN epitaxial planer phototransistor 300 (hereinafter "phototransistor 300)". The collector of the phototransistor 300 is connected to a voltage source V1. The voltage source V1 may be, for example, a five volt direct current (DC) power source. The emitter of the phototransistor 300 is coupled to a first end of a resistor 302 at a node 304. The second end of the resistor 302 is coupled to ground. The resistor 302 may be, for example, a ten kilo ohm (10 kΩ) resistor. However, the value of the resistor 302 can vary depending upon the voltage level desired at node 304.

The node 304, and any other node discussed herein, are electrical connections and may be implemented in a variety of ways depending upon the implementation of the IDIM 110. For example, if the IDIM 110 is implemented on a printed circuit board, the nodes may simply be a point where two or more electrical traces on the printed circuit board meet. In other embodiments, for example, the nodes may occur at solder joints. However, the nodes may be implemented in any fashion which allows for an electrical connection.

The output of the phototransistor 300 (i.e., the voltage of node 304) may range from, for example, zero to one and one-half volts (0-1.5V) depending upon the amount of light the phototransistor 300 receives. However, the range of output can vary depending upon the phototransistor 300 or other type of light sensor which is used.

The output of the phototransistor 300 (i.e., node 304) is coupled to the input of the filter 210. In the embodiment illustrated in FIG. 3, the node 304 is coupled to a first end of a resistor 306. In one embodiment, for example, the resistor 306 may be, for example, a sixteen kΩ resistor. However, the value of the resistor 306 can vary depending upon the desired filter frequency. As discussed above, the filter 210 filters out undesirable electrical signals, hereafter referred to as "noise", potentially caused by nearby EMI sources (e.g., fluorescent light bulbs in the same room as the system 100, or from other parts of the system circuitry). The value of the resistor 306, as well as the other components of the filter 210, can be selected to filter out undesirable noise in the output of the light sensor 200 based upon the frequency of the noise.

The second end of the resistor 306 is coupled to a node 308. A first end of a resistor 310 is also coupled to the node 308. In one embodiment, for example, the resistor 310 may be, for example, a sixteen kΩ resistor. However, the value of the resistor 310 can vary depending upon the desired filter frequency. The second end of the resistor 310 is coupled to a node 312. A capacitor 314 is coupled between node 312 and ground. In one embodiment, for example, the capacitor 314 may be a 0.1 microfarad (μF) capacitor. However, the value of the capacitor 314 may vary depending upon the desired filter frequency.

A first input of an operational amplifier 316 is also coupled to the node 312. The output of the operational amplifier is coupled to a node 318. A capacitor 320 is coupled between the nodes 308 and 318. In one embodiment, for example, the capacitor 320 may be a 0.1 μF capacitor. However, the value of the capacitor 320 may vary depending upon the desired filter frequency.

A second input of the operational amplifier 316 is coupled to a node 322. A resistor 324 is coupled between the node 322 and ground. In one embodiment, for example, the resistor 324 may be, for example, a ten kΩ resistor. However, the value of the resistor 324 can vary depending upon the desired filter frequency. A resistor 326 is coupled between the node 318 and the node 322. In one embodiment, for example, the resistor 326 may be, for example, a ten kΩ resistor. However, the value of the resistor 326 can vary depending upon the desired filter frequency.

The output of the filter (i.e., node 318) is coupled to an input of the programmable gain amplifier 220. The output of the filter at node 318 is coupled to the input Vin of the PGA 220. The second input of the PGA 220, Vref as illustrated in FIG. 3, is coupled to the output of the offset adjustment circuit 230. The output of the PGA 220 is sent to the processor 112 for processing, as discussed in further detail below. There is a bidirectional, digital communications connection 328 between the PGA 220 and the processor 112, whereby the processor 112 can adjust the gain of the PGA 220. In one embodiment, for example, the digital communications protocol between the PGA 220 and processor 112 may be a serial peripheral interface (SPI). In other embodiments, for example, the processor 112 and the PGA 220 may use other communications protocols, such as inter-integrated circuit ($I^2C$).

The offset adjustment circuit 230 includes an operational amplifier 330. As seen in FIG. 3, the output of the operational amplifier 330, at a node 332, is coupled to the second input of the PGA 220. A first input to the operational amplifier 330 is coupled to the processor 112 via resistor 334 and nodes 336 and 338. A capacitor 340 is coupled between the node 336 and ground and a capacitor 342 is coupled between the node 338 and ground. The resistor 334 and capacitors 340 and 342 operate as a low pass filter. In one embodiment, for example, the resistor 334 may be a ten kΩ resistor and the capacitors 340 and 342 may be 1.0 μF capacitors. However, the value of the resistor 334 and capacitors 340 and 342 may vary, depending upon a frequency of noise found in the typical operations environment. The processor 112 provides voltage input to the offset adjustment circuit 230 through the low pass filter (i.e., resistor 334 and capacitors 340 and 342). The output of the offset adjustment circuit at node 332 feeds into the Vref input of the PGA 220 and is used to offset the output of the PGA 220.

A second input of the operational amplifier 330 offset adjustment circuit 230 is coupled to a node 344. A resistor 346 is coupled between the node 344 and the node 332. The value of resistor 346 may vary depending on the gain desired from the operational amplifier 330. A resistor 348 is coupled between the node 344 and ground. In one embodiment, for example, the resistor 348 may vary depending on the gain desired from the operational amplifier 330. In one embodiment, for example, resistor 346 may be zero Ω and 348 may be excluded when no gain is desired.

Figure 4:
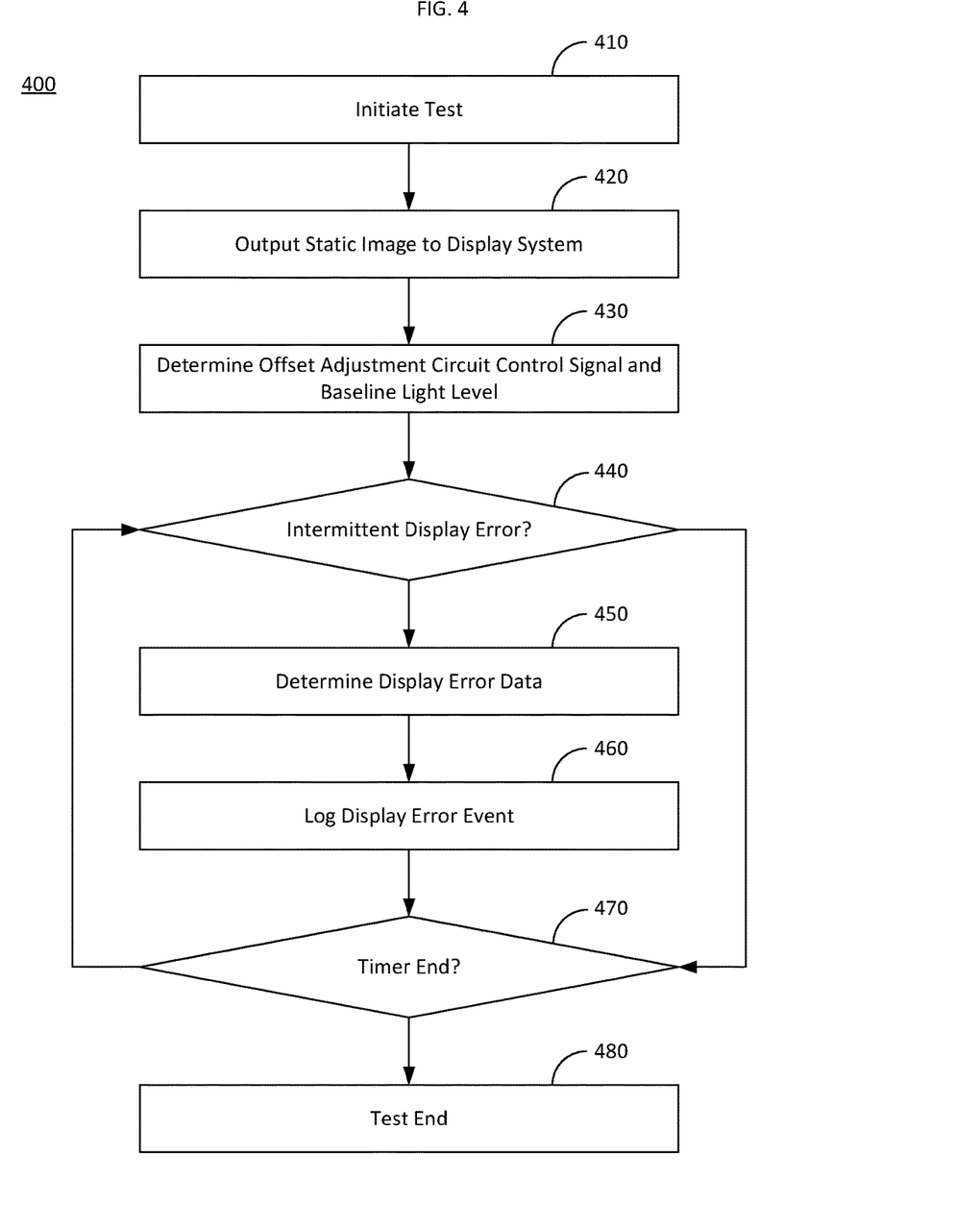
FIG. 4 is a flow diagram illustrating a method for operating the intermittent display issue monitoring system, in accordance with an embodiment.

FIG. 4 is a flow diagram illustrating a method 400 for operating the system 100, in accordance with an embodiment. The method 400 begins when a technician initiates a test session through the user interface 118 of the IDIM 110.

(Step 410). A technician, upon initiation, may have the option to set a duration of the test and the refresh rate of the display system 130 being tested. As the errors the IDIM 110 are looking for are intermittent, the test should be run for an extended period of time in order to validate the existence of a display error, or to certify that the display system 130 is operating correctly. A default test time may be, for example, two days (i.e., forty-eight hours). However, the user may shorten or extend the test time via the user interface 118. The user may also have the option to select a preset test depending upon the display system 130 being tested. The preset test may be setup for a specific product using, for example, a predefined refresh rate for the product.

A static image is then transmitted to the display system 130. (Step 420). The static image may be, for example, a solid white screen, or any other fixed image. In one embodiment, for example, the processor 112 of the IDIM 110 may transmit instructions to the tester 120 to output a signal corresponding to the static image to the display system 130. The display processing system 134, upon receipt of the signal, causes the display 132 to display the static image. In embodiments where the IDIM 110 does not directly control the tester 120, a user may have to manually initiate the tester 120 via the user interface 125 of the tester 120 to initiate the static image signal.

Once the static signal is displayed on the display 132 of the display system 130, the processor 112 of the IDIM can determine a control signal for the offset adjustment circuit 230 and determine a baseline light level. (Step 430). As discussed above, the processor 112, based upon the voltage received from the programmable gain amplifier 220, determines a signal to output to the offset adjustment circuit 230 to cause the offset adjustment circuit 230 to center the output of the programmable gain amplifier 220 within the input range of the processor 112. The baseline light level corresponds to the voltage received at the processor 112 after the processor instructs the offset adjustment circuit 230 to center the input.

The processor 112 then determines when an intermittent display error has occurred based upon the output of the sensor system 116. (Step 440). As discussed above, when the luminance of the display 132 changes, the output of the sensor system 116 (e.g., the output of the programmable gain amplifier 220 in FIG. 2 or 3), changes. In one embodiment, for example, the processor 112 may compare the output of the sensor system 116 to a programmable minimum deviation threshold. The programmable minimum deviation threshold may be selected by a user to increase or decrease a baseline at which an event is triggered. The programmable minimum deviation threshold may be set, for example, to avoid false triggering from noise. In one embodiment, for example, the processor 112 may determine that an intermittent display error has occurred when the duration of a display event is longer than a frame length of the display 132. A frame length is based upon a refresh rate of the display 132. For example, when the display has a refresh rate of, for example, sixty Hertz (Hz) the frame length would be one sixtieth (1/60) of a second. Accordingly, the processor 112 may only determine that an intermittent display error has occurred when the display event length is greater than one sixtieth (1/60) of a second such that any slight change in the luminance of the display caused by the display refresh is disregarded. The event length may be determined, for example, by determining the length of time from when the voltage changes beyond a programmed minimum deviation threshold until the voltage returns within said threshold voltage. As discussed above, the offset adjustment circuit 230 and the programmable gain amplifier 220 may together amplify the voltage output from the light sensor 200 and center the voltage within the input range of the processor 112 to, for example, two and one-half volts (2.5V). Accordingly, in this embodiment, the processor 112 would start a counter when the voltage received by the processor 112 rises or falls outside of a programmable threshold voltage range (for example, 2.4V to 2.6V), and ends the counter when the voltage returns within said threshold voltage range.

In one embodiment, for example, the processor 112 may determine display error data when the processor detects an intermittent display error. (Step 450). The display error data may include one or more of a recurrence rate, a length of the display error, an event type (e.g., blinking, flashing, arcing, etc.), and an event magnitude (i.e., the difference in the light level based upon the difference in the voltage at the output of the sensor system 116). The recurrence rate may be determined, for example, by determining a number of intermittent error events relative to a length of the test session. For example, if six intermittent errors occurred over a three day test, the recurrence rate would be two errors per day. The event type may be determined by analyzing patterns in the display error data. For example, if the display error data indicates that the screen turned off at least twice within a predetermined amount of time, the processor 112 may associate a blink error indication with the display error data. The display error data determined by the processor 112 may be used by a technician, for example, to diagnose the display system 130.

After each intermittent display error, the processor 112 logs the intermittent display error event by storing any display error data in the memory 114. (Step 460). In one embodiment, for example, the log may merely indicate that an error occurred. In other embodiments, the processor 112 may process the data acquired by the light sensor 200 to determine display error data as discussed with respect to Step 450. In these embodiments, the processor 112 logs the determined display error data for subsequent diagnosis by a technician. In one embodiment, for example, the processor 112 may log the event on the user interface 118. In other words, the processor 112 may indicate that an intermittent error has occurred on a display associated with the user interface 118, thereby indicated to a technician that an error has occurred. This may give the technician the option of ending the test early, as the IDIM 110 validated the existence of an error, or continuing with the test such that further display error data (i.e., the frequency the error is occurring or the like) can be gathered by the IDIM 110.

After the display error event is logged in Step 460, or when no intermittent display error is detected in Step 440, the processor 112 then determines if the timer associated with the test has expired. (Step 470). As discussed above, because the intermittent display errors may be so brief (i.e., a fraction of a second in length), and may occur so rarely (i.e., once every two days), the test may be run for multiple days. In one embodiment, for example, the processor 112 may update a display of the user interface 118 to indicate how much time is left in the test session. When the test has not ended, the process returns to Step 440 and the processor 112 continues to monitor the display system 130 for intermittent errors.

When the processor 112 determines that the timer associated with the test has expired, the test session ends. (Step 480). In one embodiment, for example, the processor 112, upon ending the test session, may indicate that the test session has ended via the user interface 118. For example, the processor may visual indicate the test has ended on a display of the user interface 118, audibly indicate that the test has ended via an audio device of the user interface 118, or otherwise transmit a message (e.g., an email, text message, social media post, etc.) to the technician via a communication device of the user interface 118. In one embodiment, for example, when a message is transmitted to the technician, the log file associated with the test session, or a link associated with the log file, may be included in the message. In other embodiments, the technician may manually download the log file via the user interface 118.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A system to detect intermittent failures of a display system comprising a display and a display processing system, comprising:
    a sensor system configured to capture a light level of the display, the sensor system comprising:
        a light sensor configured to output a voltage representative of the light level received by the light sensor;
        a filter coupled to an output of the light sensor, the filter configured to filter the output voltage at a frequency corresponding to a flicker of a light bulb;
        a programmable gain amplifier coupled to an output of the filter, the programmable gain amplifier configured to amplify the filtered output voltage and transmit the filtered output voltage to the processor; and
        an offset adjustment circuit coupled between the programmable gain amplifier and the processor, the offset adjustment circuit configured adjust a gain of the programmable gain amplifier to center the amplified filtered output voltage around an input voltage range of the processor; and
    a processor communicatively coupled to the sensor system and the display processing system, the processor configured to:
        transmit instructions to generate a static image for a predetermined amount of time to the display processing system, the instructions causing the display processing system to generate the static image on the display for the predetermined amount of time;
        determine, when the display is displaying the static image, a baseline light level of the display based upon data received from the sensor system;
        validate an existence of an intermittent display error when the light level of the display is greater than the baseline light level by a first predetermined amount or when the light level of the display is less than the baseline light level by a second predetermined amount at least once over the predetermined amount of time;
        determine, when the existence of the intermittent display error is validated, a recurrence rate based upon instances when the light level of the display is greater than the baseline light level by the first predetermined amount or when the light level of the display is less than the baseline light level by the second predetermined amount and the predetermined amount of time; and
        associate, when the existence of the intermittent display error is validated, an error type with each instance that the light level of the display is greater than the baseline light level by the first predetermined amount or when the light level of the display is less than the baseline light level by the second predetermined amount.

2. The system of claim 1, wherein the processor is further configured to validate the existence of an intermittent display error when a duration that the light level of the display is greater than the baseline light level by the first predetermined amount or when a duration the light level of the display is less than the baseline light level by the second predetermined amount is greater than a frame length of the display, the frame length being based upon a refresh rate of the display.

3. The system of claim 1, wherein the predetermined amount of time is greater than one day.

4. The system of claim 1, wherein the predetermined amount of time is greater than two days.

5. The system of claim 1, wherein the processor is further configured to generate a display error log, the display error long comprising display error data for each validated intermittent display error.

6. The system of claim 1, wherein the filter comprises:
    a first resistor having a first end and a second end, the first end of the first resistor coupled to an output of the light sensor;
    a second resistor having a first end and a second end, the first end of the second resistor coupled to the second end of the first resistor;
    a first capacitor having a first end and a second end, the first end of the first capacitor coupled to the second end of the second resistor, the second end of the first capacitor coupled to ground;
    an operational amplifier having a first input, a second input and an output, the first input coupled to the first end of the first capacitor;
    a second capacitor having a first end and a second end, the first end of the second capacitor coupled to the second end of the first resistor, the second end of the second capacitor coupled the output of the operational amplifier;
    a third resistor having a first end and a second end, the first end of the third resistor coupled to the second input of the operational amplifier, the second end of the third resistor coupled to ground; and
    a fourth resistor having a first end and a second end, the first end of the fourth resistor coupled to the second input of the operational amplifier, the second end of the fourth resistor coupled to the output of the operational amplifier.

7. The system of claim 6, wherein the programmable gain amplifier comprises a second operational amplifier having a first input, a second input and an output, the first input of the second operational amplifier coupled to the output of the first operational amplifier of the filter.

8. The system of claim 7, wherein the offset adjustment circuit comprises:
    a third operational amplifier having a first input, a second input and an output, the output input of the third operational amplifier coupled to the second input of the second operational amplifier of the filter;

a fifth resistor having a first end and a second end, the first end of the fifth resistor coupled to an output of the processor;

a third capacitor having a first end and a second end, the first end of the third capacitor coupled between the second end of the third resistor and the first input of the third operational amplifier, the second end of the third capacitor coupled to ground;

a sixth resistor having a first end and a second end, the first end of the sixth resistor coupled to the second input of the third operational amplifier, the second end of the sixth resistor coupled to the output of the third operational amplifier; and a seventh resistor having a first end and a second end, the first end of the seventh resistor coupled to the second input of the third operational amplifier, the second end of the seventh resistor coupled to ground.

9. An intermittent display issue monitor configured to detect intermittent failures of a display system comprising a display and a display processing system, the intermittent display issue monitor comprising:

a processor;

a sensor system communicatively coupled to the processor, the sensor system configured to capture a light level of the display, the sensor system comprising:
  a light sensor configured to output a voltage representative of the light level received by the light sensor;
  a filter coupled to an output of the light sensor, the filter configured to filter the output voltage at a frequency corresponding to a flicker of a light bulb;
  a programmable gain amplifier coupled to an output of the filter, the programmable gain amplifier configured to amplify the filtered output voltage and transmit the filtered output voltage to the processor; and
  an offset adjustment circuit coupled between the programmable gain amplifier and the processor, the offset adjustment circuit configured adjust a gain of the programmable gain amplifier to center the amplified filtered output voltage around an input voltage range of the processor; and wherein the processor is configured to:
  transmit instructions to generate a static image for a predetermined amount of time to the display processing system, the instructions causing the display processing system to generate the static image on the display for the predetermined amount of time;
  determine, when the display is displaying the static image, a baseline light level of the display based upon data received from the sensor system;
  validate an existence of an intermittent display error when the light level of the display is greater than the baseline light level by a first predetermined amount or when the light level of the display is less than the baseline light level by a second predetermined amount at least once over the predetermined amount of time;
  determine, when the existence of the intermittent display error is validated, a recurrence rate based upon instances when the light level of the display is greater than the baseline light level by the first predetermined amount or when the light level of the display is less than the baseline light level by the second predetermined amount and the predetermined amount of time; and
  associate, when the existence of the intermittent display error is validated, an error type with each instance that the light level of the display is greater than the baseline light level by the first predetermined amount or when the light level of the display is less than the baseline light level by the second predetermined amount.

10. The intermittent display issue monitor of claim 9, wherein the filter comprises:
  a first resistor having a first end and a second end, the first end of the first resistor coupled to an output of the light sensor;
  a second resistor having a first end and a second end, the first end of the second resistor coupled to the second end of the first resistor;
  a first capacitor having a first end and a second end, the first end of the first capacitor coupled to the second end of the second resistor, the second end of the first capacitor coupled to ground;
  an operational amplifier having a first input, a second input and an output, the first input coupled to the first end of the first capacitor;
  a second capacitor having a first end and a second end, the first end of the second capacitor coupled to the second end of the first resistor, the second end of the second capacitor coupled the output of the operational amplifier;
  a third resistor having a first end and a second end, the first end of the third resistor coupled to the second input of the operational amplifier, the second end of the third resistor coupled to ground; and
  a fourth resistor having a first end and a second end, the first end of the fourth resistor coupled to the second input of the operational amplifier, the second end of the fourth resistor coupled to the output of the operational amplifier.

11. The intermittent display issue monitor of claim 10, wherein the programmable gain amplifier comprises a second operational amplifier having a first input, a second input and an output, the first input of the second operational amplifier coupled to the output of the first operational amplifier of the filter.

12. The intermittent display issue monitor of claim 11, wherein the offset adjustment circuit comprises:
  a third operational amplifier having a first input, a second input and an output, the output input of the third operational amplifier coupled to the second input of the second operational amplifier of the filter;
  a fifth resistor having a first end and a second end, the first end of the fifth resistor coupled to an output of the processor;
  a third capacitor having a first end and a second end, the first end of the third capacitor coupled between the second end of the third resistor and the first input of the third operational amplifier, the second end of the third capacitor coupled to ground;
  a sixth resistor having a first end and a second end, the first end of the sixth resistor coupled to the second input of the third operational amplifier, the second end of the sixth resistor coupled to the output of the third operational amplifier; and
  a seventh resistor having a first end and a second end, the first end of the seventh resistor coupled to the second input of the third operational amplifier, the second end of the seventh resistor coupled to ground.

13. The intermittent display issue monitor of claim 9, wherein the processor is further configured to validate the existence of an intermittent display error when a duration that the light level of the display is greater than the baseline light level by the first predetermined amount or when a duration the light level of the display is less than the baseline light level by the second predetermined amount is greater than a frame length of the display, the frame length being based upon a refresh rate of the display.

14. The intermittent display issue monitor of claim 9, wherein the predetermined amount of time is greater than twenty-four hours.

* * * * *